April 14, 1942. J. F. TURNER ET AL 2,280,049
ICE CUBING MACHINE
Filed June 13, 1936 6 Sheets-Sheet 3

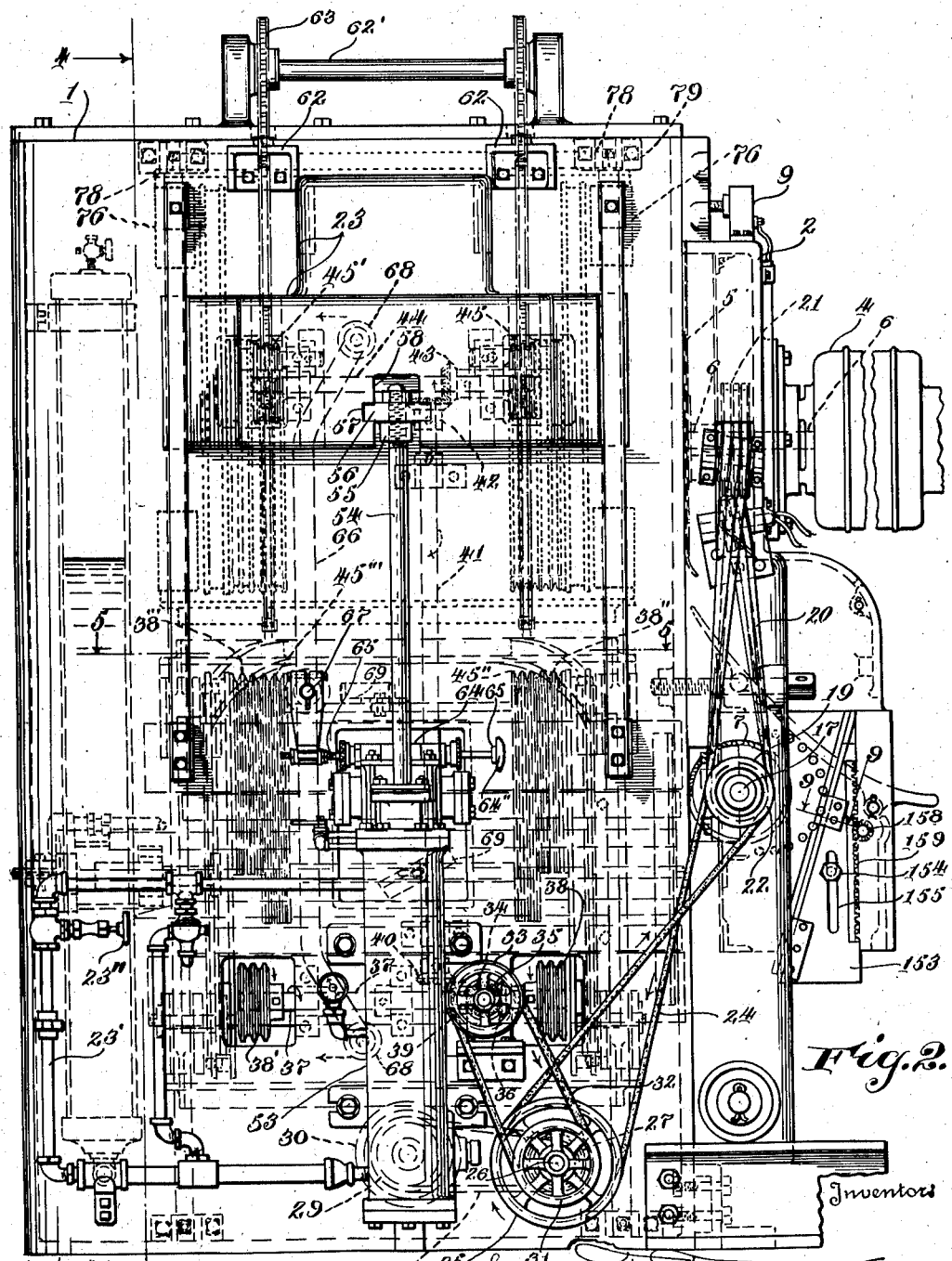

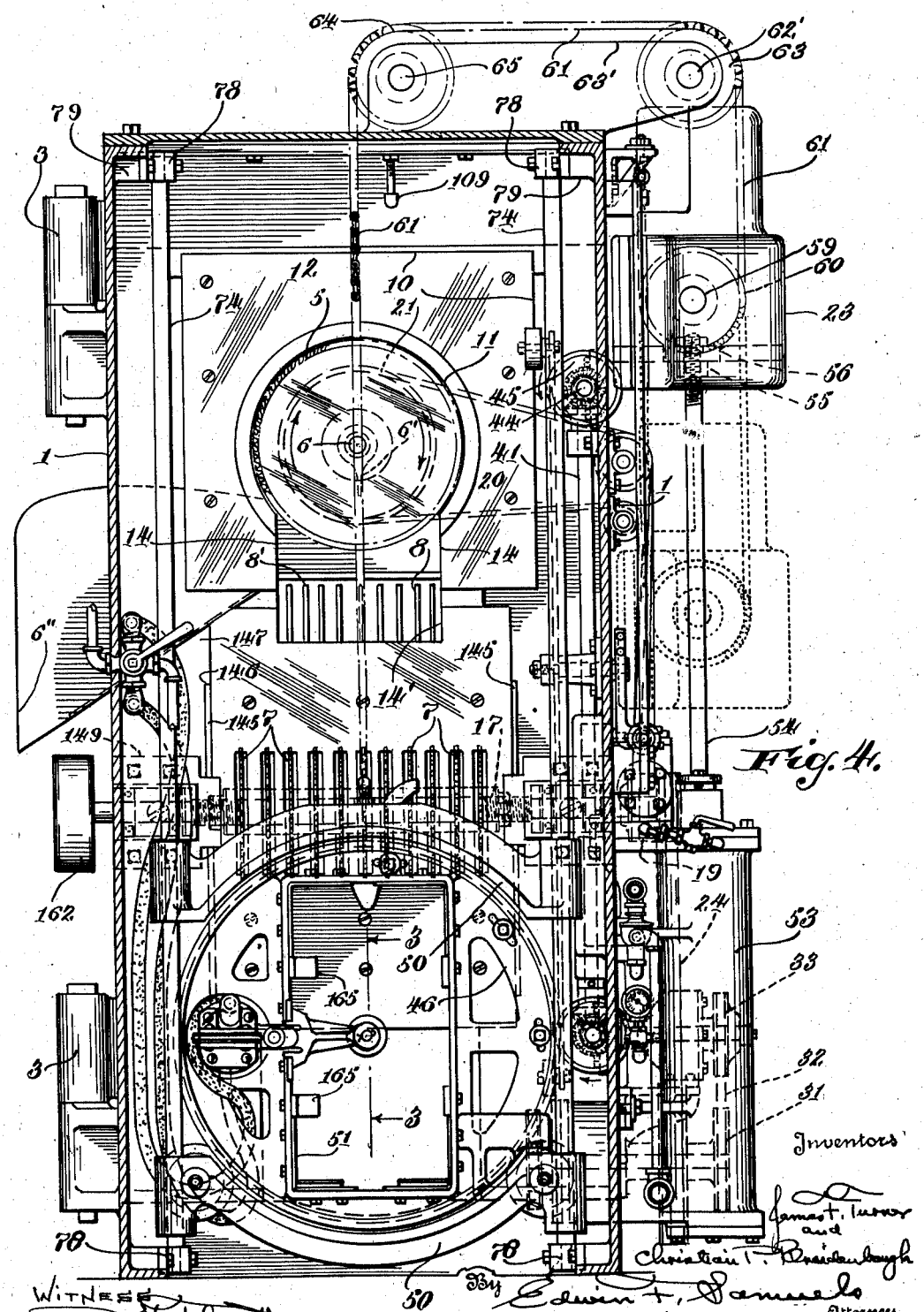

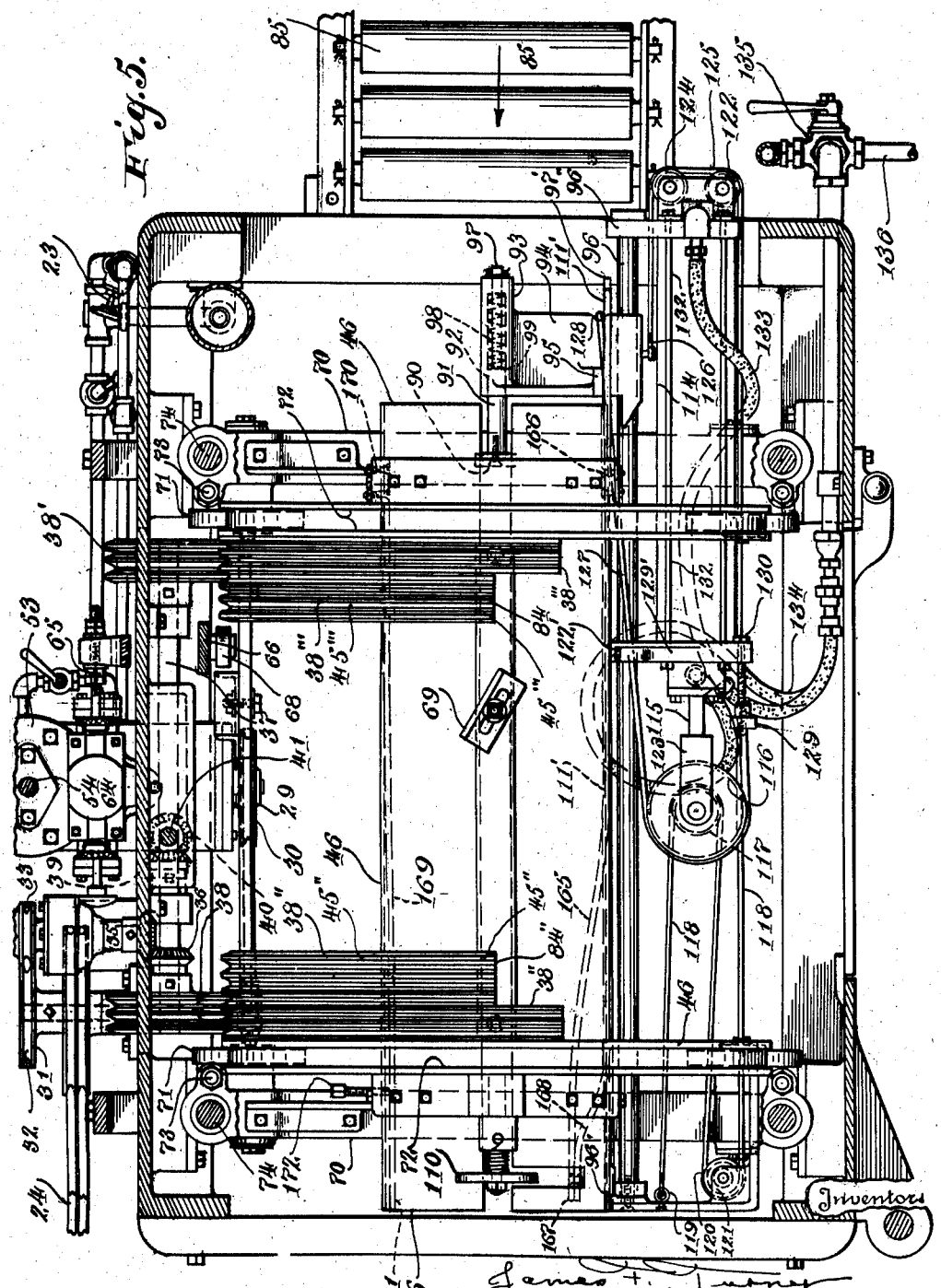

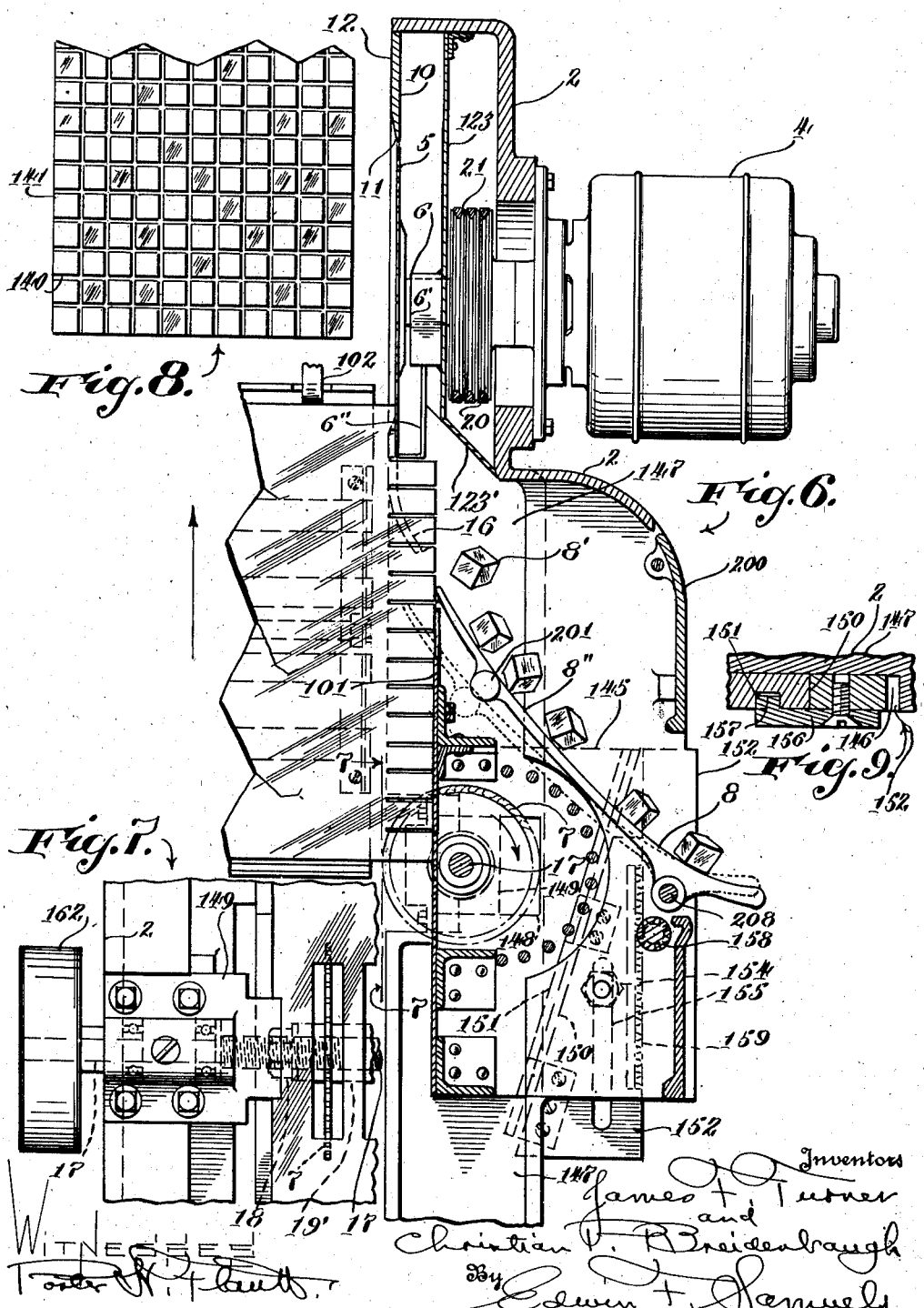

Patented Apr. 14, 1942

2,280,049

UNITED STATES PATENT OFFICE 2,280,049

ICE CUBING MACHINE

James F. Turner and Christian P. Breidenbaugh, Baltimore, Md., assignors to Flynn & Emrich Company, Baltimore, Md., a corporation of Maryland Application June 13, 1936, Serial No. 85,136

40 Claims. (Cl. 143—38)

The invention relates to a machine for producing ice cubes or other small flat faced blocks. While size is not material these blocks would be used for the same purposes as any cubes which are made in domestic refrigerators and the tendency would be to make them approximately the size of such cubes and to make them cubical. The cut blocks in the practice of the invention are made by cutting up relatively large cakes of ice.

The standard size blocks produced in the artificial ice machines in general use weigh approximately three hundred pounds and the present machine has been designed to accommodate this type of block but it may be made to suit any size or shape of block and the machine may be employed for cutting any kind of large block material into small uniform blocks.

Relatively crude machines for this purpose have been in use for a considerable period but these machines are slow in their operation and extremely dangerous on account of the exposure of the hands of the operator to the saws. An object of the present invention is to give increased speed of operation, hence increased capacity and increased economy of time and space and absolute safety to the operator from injury by contact with the saws and/or the moving parts of the machine.

It is also an object of the invention to produce a machine which in view of the operation required is relatively simple and cheap to construct, of very long life, also involving a very low cost of maintenance in that the nature of the mechanism is such that it is apt not to get out of order. It is also of importance that the machine can be operated with the highest degree of efficiency by unskilled labor, no mechanical knowledge or experience being necessary.

The machine has the further advantages that the axes of the saw shafts in the preferred form of the machine are stationary during the cutting operation, and the saws are so arranged that it is easy to protect them and such protection is provided making it practically impossible for the hands of the operator to come in contact with the rotating saws either during the operation of the machine or during adjustments thereof. It is an important feature of the machine to which however the broader conception of the invention is not limited that the saws and driving mechanism therefor are mounted on a protecting panel or door, which forms the front of the machine, the direction from which the ice cakes are fed being referred to as the back of the machine and this panel and frame is mounted movably so that when the machine is not in operation the portion of the machine carrying the saws and driving mechanism can be separated from the remainder of the machine to expose the saws and other parts for inspection, adjustment or repair or replacement and in accordance with the preferred construction the saws are electrically driven and the circuit is so arranged that the movement of the panel exposing the saws breaks the circuit, making injury due to contact with saws when the machine is thus opened impossible as the saws cannot be driven when the panel is open.

In the construction shown the cutting elements consist of a series or gang of scoring saws of the circular type mounted on a single shaft and spaced apart to give the desired width of the blocks in both lateral directions, and in addition to the scoring saws there is a cutoff saw by which the cubes are finally separated from the cake after they have been scored. The shaft carrying the cutoff saws is arranged near the front at right angles to the shaft carrying the scoring saws, the plane of cut being substantially at right angles to the cutting planes of the scoring saws, though the angle of cut is not absolutely essential as the blocks may be cut in a variety of shapes by obvious changes of arrangement. The cubical shape is at present preferred. It is also of interest in the form of machine shown that there is a table for the scoring saws which positions the ice cake during scoring and a table for the cutoff saw. These tables in the form of the invention shown are parallel and the relation of the plane of one table to the plane of the other table determines the depth of the cubes, the depth being the dimension at right angles to the planes of both cuts which are effected by scoring.

The cake of ice being operated upon is in the preferred form of the machine carried in a cage or carrier in which it is to the best advantages held between an adjustable centering member and a resilient takeup, the adjustment of the centering member provides for centering the cake in such a way that it is evenly divided by the scoring saws, avoiding loss incident to the cutting of small unusable fragments due to the occurrence of cakes of odd sizes or irregular shape. By this adjustment it is possible to adjust the position of the cake so that the cubes produced from the opposite surfaces may be made of approximately the same size and the waste reduced to a minimum.

It is also of interest that the takeup arrangement whereby the ice is held in close contact with the adjustable centering member, prevents any side play of the ice cake and hence avoids side stress on the saws which would be destructive thereto reducing their length of life by bending and breaking, or causing deterioration of the saws.

In the operation of the machine the carriage is raised and/or lowered to present the ice cake to the saws for each cutting operation. This may be performed by any suitable device. In the preferred form shown this is done by means of a hydraulic cylinder, the carriage being counterbalanced or overbalanced to reduce or equalize the load to effect an economy of power. In the machine shown, the cake is turned at each end of its traverse. The side or end of the cake which is presented to the saws is first scored in one direction on one traverse, the cake being then turned at the end of the traverse and scored in a direction at right angles to the first scores. As already pointed out, the scoring saws are spaced to give the desired size of cube and the entire end or side of the cake is scored in each operation of the scoring saws performed in one up or down traverse of the carriage and cake of ice. After scoring in this way providing two sets of scores at right angles for the depth of the cubes, the cubes are severed from the cake by the cutoff saw which in the form shown is above the scoring saws. This cutoff saw cuts at right angles to the scores and as the cake descends to the scoring saws, it is advanced a distance equal to the depth of the cubes.

It is of advantage that the mechanism is so arranged that by a controlling means operated by the carriage that each traverse is under control of the motion of the carriage and no traverse can take place until the carriage has been turned to the exact position for the next cutting or scoring operation so that there can be no departure from the normal shape of the cubes and no preventable waste.

It is further of interest in the preferred form of the machine, that the feed of the cake on and relatively to the carriage and toward the saws which is preferably hydraulic, and may be somewhat slow, being ordinarily operated at city supply water pressure is provided with a resilient takeup applying forward pressure to the cake at all times and causing an instantaneous advance of the cake after the cutoff operation so that there can be no failure to cut in the next scoring operation to the full depth for which the machine is set. The advance at this time is according to the construction shown equal to the spacing of the scoring and cutoff saw tables.

After the cubing of each cake is completed and a new cake is to be presented, the feed is retracted by a power device in the preferred form under the control of the operator so that the operator does not reach into the machine to retract the feed avoiding danger of contact with the saw. Also the member which engages the ice cake from the rear to advance it in feeding moves automatically out of the way of the cake at the rear end of the stroke providing for the easy and quick introduction of a new cake when the one in the machine has been consumed.

While the machine as shown and described and as developed to date provides for the lifting and lowering of the cage or carriage and the ice cake, as the cake is passed in contact with the saws in cutting and this direction of motion is regarded as preferable, operation in a vertical path is not absolutely essential to the satisfactory operation of the machine. The preferred arrangement, however, contributes to the cheapness and simplicity of the construction as it provides for the use of a single acting hydraulic cylinder to raise the carriage, the carriage being lowered by gravity, and for this reason not fully counterbalanced. It is also to be noted that the term "cubes" has been used for convenience in describing the shapes which are cut from the large cakes of ice in the operation of the machine. Such cubes are in general use and seem to be preferred by the trade, but the machine may be arranged without departure from the invention to cut other shapes, though, for convenience and economy these shapes are preferably flat sided.

In the accompanying drawings we have illustrated a machine embodying the invention in the preferred form.

In the drawings:

Figure 2 is a side elevation looking at the machine from the left, as it is seen in Figure 1.

Figure 4 is a rear elevation, the casing being shown in section on line 4—4 in Figure 2.

Figure 5 is a horizontal section on the line 5, 5 in Figure 2.

Figure 6 is a fragmentary section on the line 6, 6 in Figure 1, the motor casing being shown in elevation.

Figure 7 is a fragmentary elevation of the scoring saw shaft and one of the saws thereon and the adjustable carriage therefor looking from the line 7, 7 in Figure 6, in the direction of the arrows.

Figure 8 is a fragmentary elevation of the scored end of a cake of ice looking at the same from the front of the machine, i. e., from the right in Figure 6.

Figure 9 is a fragmentary section on the line 9, 9 in Figure 2.

Figure 1:
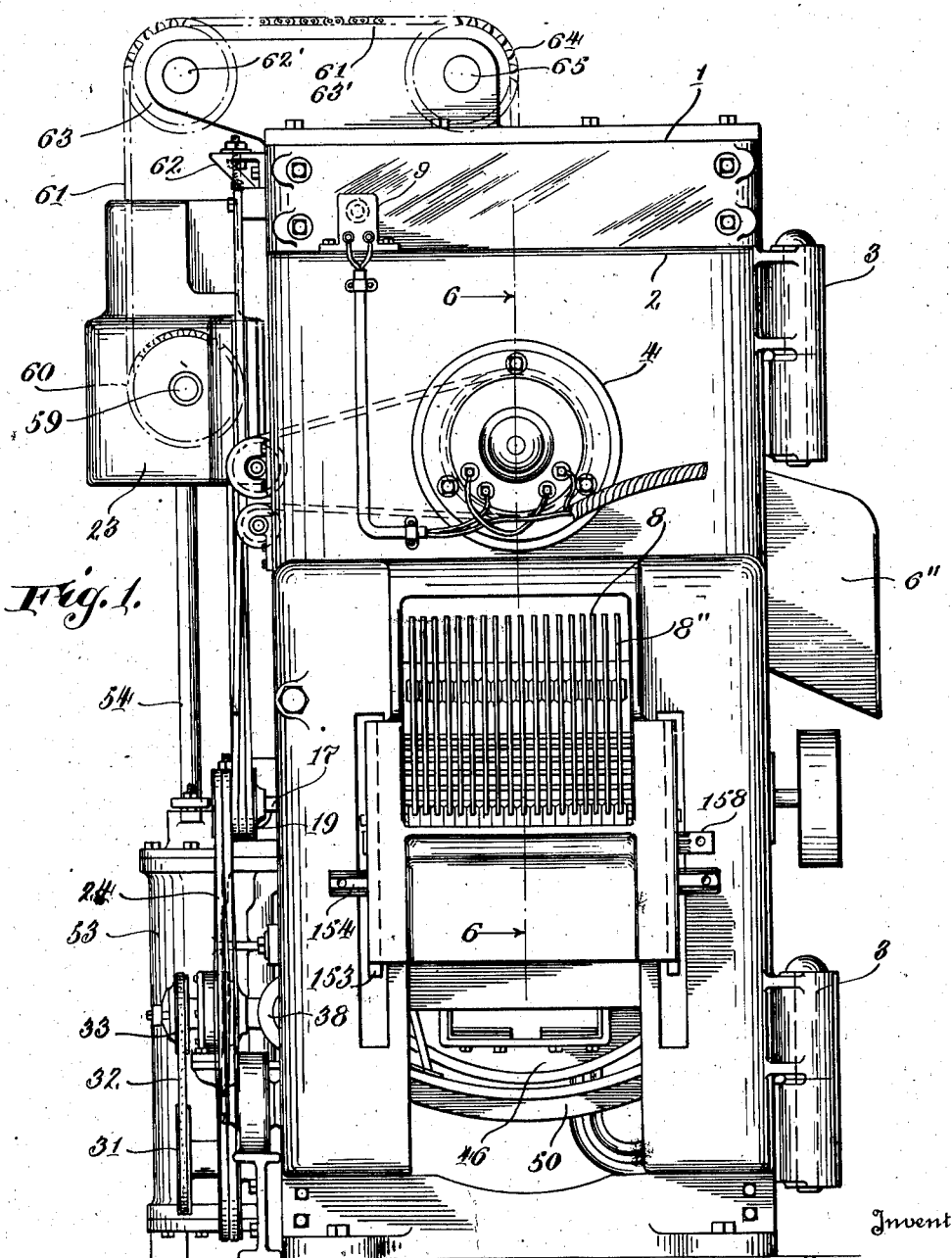
Figure 1 is front elevation of the machine.

The machine as shown various changes of design being obvious to those skilled in the art comprises a casing 1, in which the working parts are, in operation, completely enclosed, so that the operator and those in the vicinity of the machine, are fully protected. At the front of the machine is a door 2 of comparatively thick, heavy metal or otherwise of rigid construction. This door is mounted to swing outwardly on hinges 3. In accordance with the preferred form of the invention, the motor 4, the cutoff saw 5, which is on the motor shaft 6, the scoring saws 7 and the discharge chute 8 and other accompanying parts all of which are to be further described, are mounted on the door 2. The motor 4, which is enclosed in a suitable casing on the outside of the door or panel 2, see Fig. 6, the saws and other parts being on the inside, so that when the door is open they swing outwardly into full view and are fully accessible for inspection, repair and replacement, being at other times fully enclosed and guarded for the full protection of the operator.

A further and important protection for the operator in the preferred form of the machine consists in the provision of an automatic switch 9 which is opened as the door swings backwardly to open position so that the saws can be rotated by the motor only when the door is closed and they are instantly stopped when the door is opened. By placing the saws at the extreme front of the machine opposite the point of feed and completely enclosing them and making it impossible to run them when the door is open, the operator is completely protected from contact with the saws while they are running. The machine also includes further provision to this end to be described.

The cutoff saw 5, as already suggested, is mounted on the shaft 6 of the motor 4 to rotate in a plane at right angles to the shaft, and provided with a table 10 which is parallel to the plane of the saw and has a circular opening 11 substantially surrounding the saw. The table 10 has its supporting surface 12 slightly to the rear of the cutting plane of the saw, and is slotted vertically below the saw at 14, the slot extending from the bottom edge of the table up to and intersecting the opening 11. The slot 14 is of such width that the narrow dimension of the regulation 300 pound cake of ice enters therein with sufficient freedom to obviate interference with the operation of the machine on account of any variation in the size of the cakes.

Figure 6 shows the lower edge of the table at 16 deflected forwardly and downwardly to guide the cake and ease the motion of the cake as it moves forwardly and downwardly into contact with the scoring saw table 101 to be described. The ice cake after the first scoring operation moves to the top of its traverse, being held from contact with the saws by a stop to be described, is turned over, passes downwardly for a first scoring operation, when it is again turned and moved upwardly in the second scoring operation, the score being at right angles to the first score. The cake then enters slot 14 when the scored portion at the front of the block is cut off by the saw 5 in the form of cubes.

The scoring saws 7 are mounted in gang arrangement on the scoirng saw shaft 17 which is below and at right angles to the motor shaft 6 which carries the cutoff saw 5.

In the form of the invention shown there are eleven of the scoring saws 7 on the shaft 17 secured by means of nuts 18 at the ends of the shaft 17, each saw being apertured at the center to pass the shaft and the saws being suitably spaced and secured in accordance with the regular practice in mounting gang saws. Outside the nut 18 at one end are pulleys 19 operated by belts 20 from the driving pulleys 21 on the motor shaft.

There is also a double groove pulley 22 which drives two belts 24, which operate a pulley 25 on an intermediate shaft 26. This intermediate shaft 26 carries secured thereto a pulley 27 which drives belts 28 which in turn drive a pulley 29 which operates the pump 30, which applies pressure to and propels the hydraulic fluid in the hydraulic system to be described. The shaft 26 also carries secured thereto a pulley 31 which drives belts 32 which, in turn, drive a pulley 33 on a shaft 34 which carries a bevel gear 35, which meshes with a bevel gear 36 which is on a horizontal shaft 37 at the bottom of the machine, which shaft carries the grooved friction pinions 38 at the front end 38' at the rear of the machine. These are the pulleys which operate the turntable at the top and bottom of the traverse of the carriage, as hereinafter described.

Figure 10:
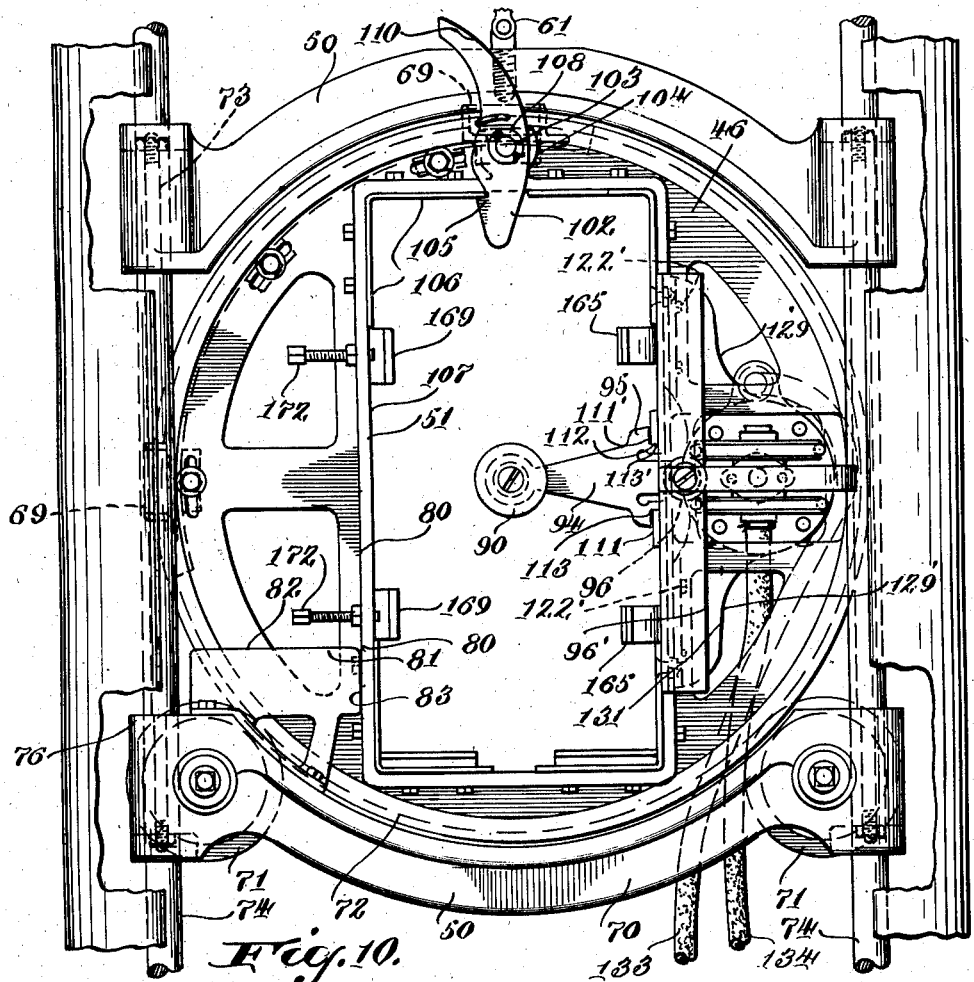
Figure 10 is an elevation of the carriage, showing fragmentarily the ways on which it moves and also showing the turntable carried by the carriage, and the cage on the turntable which encloses the cake of ice being operated upon, the view being taken from the front of the machine with the door removed.

The shaft 37 also carries a bevel gear 39, all of these gears being shown in Figure 2, which bevel gear 39 meshes with bevel gear 40 on a vertical shaft 41, which carries at its upper end a bevel gear 42 which meshes with and drives a bevel gear 43 on the horizontal pinion shaft 44 near the top of the machine. This shaft 44 carries secured thereto grooved friction pinions 45 at the front of the machine and 45' at the rear of the machine. The turntable 46, Figures 4 and 5 and 10, is provided at the front and rear with segmental grooved friction gears 45'' and 45''', which are engaged by the pinions 45 and 45' respectively at the top of the stroke of the carriage and similar segmental grooved friction pulleys 38'' and 38''' at the front and rear, which are engaged and driven by the pinions 38 and 38' at the bottom of the stroke. These pulleys are of the same diameter and all concentric with the axis of turntable 46.

The carriage 50, see Fig. 4, which carries the turntable 46 on which the cage 51 is mounted, is moved up and down in continuous reciprocation during the operation of the machine by a piston rod 54, secured to a hydraulic piston now shown, operating in the hydraulic cylinder 53, the carriage 50 being connected through other agencies, including the counterweight 23, to the piston by the piston rod 54.

This connection between the rod and the counterweight in the form shown is effected by means of a nut 55 threaded on to the end of the rod 54. This nut is flanged at 56 and the flange enters and engages slots 57 in the counterweight 23, which slots are formed laterally in the sides of a vertical slot 58 in the weight into which the rod 54 extends and in which the nut 55 is located. The counterweight 23 as shown is provided with a horizontal sprocket shaft 59, see Figs. 1, 2 and 4, which carries at each end a toothed sprocket 60. These sprockets are engaged as to their lower arcs by sprocket chains 61 which are secured at their ends i. e. at one end of each said chain adjacent the casing and above said sprockets to bracket 62 on the casing, see Fig. 1. From bracket 62 they are passed downwardly about the lower arcs of said sprockets 60 and upwardly about the corresponding quadrants, i. e., the outer and upper quadrants of guide sprockets 63, mounted on a shaft 62' supported in brackets 63' on the casings from which sprocket 63 the chains 61 pass horizontally to and about corresponding opposite upper quadrants of guide sprockets 64 in bracket 63'. The sprockets 64 are carried on a shaft 65 which extends horizontally in a fore and afterly direction of the casing which is also true of shaft 62'. From these sprockets 64 the chains 61 extend downwardly, being secured at their lower ends to the top of carriage 50, see Fig. 4, the ends which are secured to the top of carriage 50 being the opposite ends of the chains to those secured to bracket 62 as above (see Figs. 1 and 4).

The counterweight makes it possible to use a hydraulic cylinder of considerably less power than would be required in the absence of the counterweight, the power exerted on the up and down strokes of the carriage, respectively, being almost the same.

The motion of the carriage is in the form of the invention shown reversed at each end of its stroke by means of a slide valve 64 which controls the hydraulic piston, see Fig. 2. As such valves are well known in the steam and particularly in the hydraulic motor art, no detailed description is considered necessary. The slide valve 64 which is shown externally as to the casing only is operated by a valve rod 65, connected in any suitable manner as shown to the valve shifting lever 66.

This lever is pivoted intermediately at 67 to swing in a fore and aft plane, the pivot being spaced but slightly above the valve rod 65, the spacing being just sufficient to impart the necessary motion to the valve from and by the swing of the lever. The lever 66 carries at its upper and lower ends practically at the respective ends of the path of the carriage 50 suitable cam rollers 68. These cam rollers are engaged and operated by cams 69 on the turntable 46 at each respective end of its swing. For this purpose the cams are located 90 degrees apart, as shown in Figure 10. The operation of the reversing mechanism in this way by the cams 69 on the turntable, arranged as described, avoids any possibility of reversing the carriage prior to the completion by the turntable of its 90 degree arc of rotation. Such an accidental out of time operation would seriously damage, if not destroy, the scoring saws.

The carriage 50, Figure 10, is composed in the form shown of two upper and two lower arcuate members 70, the lower members 70 being provided at each end with bearing rollers 71, suitably journalled thereon and engaging tracks or grooves 72 in the outer peripheral edge of the circular turntable 46. The upper and lower arcuate bearing members 70 enclosing the turntable at the top and bottom, are secured together by vertical rods 73 shown in dotted lines in Figure 10, and the carriage is guided for reciprocation on vertical guide rods 74 suitably secured at their upper and lower ends in the casing by collars 78, the guide rods being engaged by slide bearing members 76 at each end of each arcuate bar 70.

The bearing members 76 at the respective ends of the traverse of the carriage 50 engage the stop collars 78, which hold the guide rods 74 at the top and bottom, being formed integrally with supporting brackets 79 secured to the casing on the inside.

In the operation of the carriage reciprocating mechanism the carriage at each end of its stroke is stopped and held during a short dwell by contact of bearings 76 with the stop collars 78 during which dwell period the pressure in the hydraulic cylinder is backed up or somewhat increased by the operation of the pump. During this period the turntable is rotated as hereinafter described and at the end of the arc of rotation which is determined by contact of the outside wall 80 of the ice cage 51 with the stop 81 on the lower bar 70 of the carriage 50, the respective cams 69 operate on the corresponding followers 68 to effect the reversal of the hydraulic piston in the cylinder 53 and the consequent reversal of motion of the carriage 50. The stop 81 has an upper horizontal stop surface 82 which is engaged by the wall 80 of cage 51 in the horizontal position of the cage in which the long dimension of the ice is horizontal and an upright stop surface 83, which is engaged by the wall 80 of the cage 51 in the upright position of the cage in which the long dimension of the ice cake is vertical. The cage is moved to vertical position at the bottom of the stroke and to horizontal position at the top of the stroke. The above dimensions refer to the cross section of the cake in the plane of the cutoff saw.

In the oscillation of the turntable the table rotates 90 degrees counterclockwise, i. e. to the left from the position in which it is shown in Figure 10 and 90 degrees back to the position in which it is shown in said figure.

Reference has already been made to the grooved friction pinions 38, 38' and 45, 45', near the top and bottom of the machine which rotate or more properly, oscillate, the turntable 90 degrees as above described at each end of the vertical stroke of the carriage 50. To effect this oscillatory motion of the turntable 46 through the 90 degree arc described, the turntable is provided externally at each end as shown in Figure 2 and more clearly in Figure 5, previously described, with segmental grooved friction gears, 38'', 38''' and 45'', 45''', previously described. The lower grooved friction pinions 38, 38' are also shown in Figure 5 in mesh with segmental grooved friction pulley 38'', 38''', the carriage 50 being as shown in this Figure 5, at or near the bottom of its stroke.

As clealy shown in Figures 2 and 5, the segmental grooved friction gears, it being understood that any suitable type of gearing may be substituted, are discontinued at the end of the path of contact to avoid unnecessary friction and wear of the pinions and gears when the turntable has completed its oscillation and come in contact with the stop 81. The flat surfaces 84 are the ends of the segments, it being an incident to the construction shown that the segmental gears 38'', 38''' are in line with the pinions 38, 38', which are in the path of these gears, and the segmental frictional gears 45'', 45''', are in line with the friction pinions 45, 45' at the top which may be otherwise described as in the path of the segmental grooved friction gears 45'', 45'''.

The ice cake to be cubed is fed to the cage 51 by way of the rollers 85 shown at the right in Figure 5, the feeding preferably taking place at or near the bottom of the machine, or at any convenient elevation.

Figure 3:
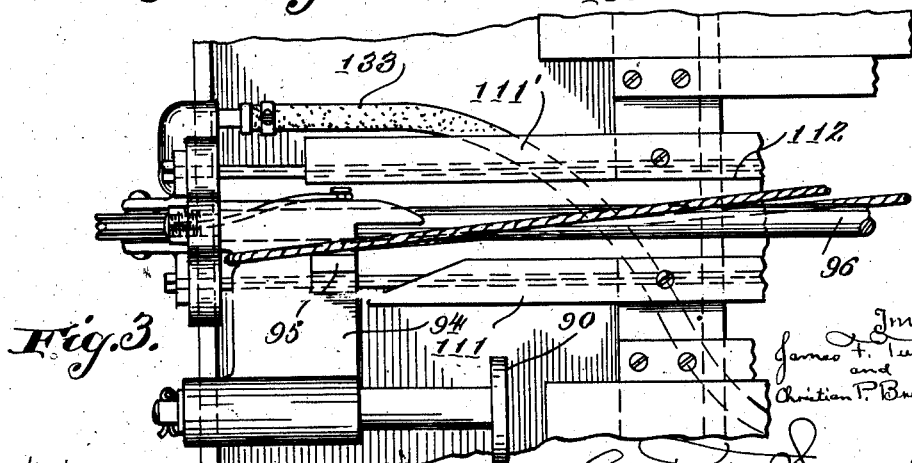
Figure 3 is a fragmentary elevation on line 33 in Figure 4, looking in the direction of the arrows and illustrating the device in releasing the pusher to drop it from the path of the cake.

Feeding is accomplished, see Figures 3, 5 and 10, in accordance with the preferred construction shown by means of a thrust member 90. This thrust member 90 is carried by a plunger 91 which is mounted for reciprocation in a bore or cylinder 92, which extends in the direction of the axis of the turntable and is formed in the head 93, which head is carried at the outer end of an arm 94 which projects laterally from a sliding traveller 95, which is mounted to slide in the direction of feed on a longitudinal horizontal feed rod 96 which extends horizontally in the direction of said axis from one end to the other of the casing 1. This rod is supported at the front end in bracket 96' on the cage wall 106, and at its rear end to the head 96'' carried by cable-end head 129' secured to frame 107 of ice cage 51, see Figure 10. The thrust member during the feeding operation in the preferred form of the invention shown moves on a path which is substantially central of the transverse cross section of the ice cage or container 51 extending as aforesaid in the direction of feed and parallel to the axis of the turnable with which in the form shown the path of the thrust member is substantially identical.

In the initial feeding position of the parts, i. e., with the long dimension of the cross section of the ice cage vertical, the feed rod 96 is at the right center in Figure 10, just outside the cage 51, it swings with the cage and turntable remaining parallel to the axis thereof. In the form shown the plunger 91 is shouldered and reduced at the rear inside of the cylinder 92 and this reduced portion 97 serves as a guide rod, sliding in a bearing in the end of the cylinder. This guide rod 97 is enclosed within a helical spring 98 which bears at one end against the shoulder 99 and at the other end against the rear wall of the cylinder or bore 92. The end of the rod is held against full release and stopped by a cotter pin. The spring 98 provides for the quick advancement of the ice cake particularly after it has been turned in its top position as hereinafter described and moved downwardly over the table 10 and the guide 16 with its long transverse dimension horizontal, thus bringing it into engagement with the scoring saws 7 and scoring saw table 101.

In the absence of such a spring it might happen that the hydraulic feed to be described would not respond with sufficient speed to cause the cake to be scored throughout its end area to the full depth intended. In this scoring operation the cake rests against and is guided by the scoring table 101, see Figure 6.

To prevent the cake from advancing into the plane of the cutoff saw 5, as it moves upwardly when first supplied to the cage 51, a detent or automatically controlled stop 102 is provided at the top of the cage and suitably spaced from the forward end of the cage where cutting takes place. This detent 102 is shown in Figure 10 in the form of a lever which is substantially vertical in its normal operative position in which it acts to prevent the ice from advancing into contact with the saws. It is mounted for oscillation upon and about a stud or short shaft 103 which is seated in a bracket 104 projecting upwardly from the top of the cage frame 80 or otherwise mounted on the turntable 46. This detent lever 102 has a notch at 105 on the left side below the stud 103, as seen in Figure 10, which notch engages the plate 106, which forms the wall of the cage 51, such plates being secured to the cage frame 107 at the corners. By this engagement of the notch 105 with the edge of the plate 106, the detent is positioned in the path of the ice. It is held in this position by a coil spring 108 which is wound around the stud or shaft 103, being secured at one end to the bracket 104, and at the other end to the detent. To remove the detent from the path of the ice at the top of the transverse of the carriage 50, a dog 109 is provided, which projects downwardly from the top of the casing. This dog engages a curved or inclined cam surface 110 on the top right hand side of the detent lever 102, the said surface sloping downwardly to the right, as seen in Figure 10, which as already pointed out, is a view looking from the rear end of the machine, the front being as aforesaid the end at which the cut cubes are delivered and in the form shown the end where cutting takes place and the saws are located.

The traveller 95 during the feeding operation moves in and on a slotted track 111, 111' shown in end elevation in Figure 10 and in side elevation in Figure 5. The traveller 95 is slotted at each top and bottom sides, at 113, 113' as seen in Figure 10 to receive the tracks 111' and 111 and the traveller extends through the slot 112 into engagement with the feed rod 96 which extends through a hole in the bottom end of the traveller 95.

The track 111, 111' terminates at the rear short of the end of the feed rod 96 leaving an opening 97' so that when the traveller is fully retracted it moves beyond the track or tracks 111 and arm 94 passes out of the slot 112 and swings by gravity or may be swung in any suitable manner as by resilient means, through said opening 97' about the rod 96 out of the path of the ice cake to permit a new cake of ice to be fed to the cage in any suitable manner as by way of the rollers 85 or other presentation means.

In order to provide for a free swing of the traveller 95 and thrust member 90 and other parts carried by the traveller, the latter is connected to the hydraulic piston rod 115 to be described or other source of feeding power by a flexible means which permits it to move laterally of its path in this way when disengaged from the track 111.

The power for feeding the ice, as already suggested, is provided by a hydraulic cylinder 114, the piston therein not shown. The piston in the hydraulic cylinder 114 operates a piston rod 115 which reciprocates in the direction of the feed and carries on the head 123 pulleys of different sizes as indicated at 116 and 117 in Figure 5, 116, the large size pulley, and 117, the small size pulley.

The pulley 117 is encircled at its rearmost 180 degree arc by a cable or cables 118 secured at one end to the cage at its forward end at 119, the other end portions of cables 118 are carried forwardly and passed around the forward 180 degree of pulleys 120 which are mounted on the cage frame in a suitable support 121. From the pulleys 120 the cables 118 are carried rearwardly to and about the rear arc of pulleys 122 and 124 mounted on a bracket 125 at the rear end of the cage and these cables are then carried forwardly from the top of the pulleys 124, being secured at their ends opposite to the end 119, said ends being indicated by reference character 126 to the traveller 95.

The large pulleys 116 carried by the cross head 123, carries a pair of cables or a double cable 127. The pulley 116 may be either a double groove pulley, or there may be two pulleys of similar size, and the double cable 127 is looped about the rear of the traveller 95 in the form of the invention shown, engaging a groove 128. As shown, the double cable 127 passes around the forward 180 degree arc of pulleys 116 and the cable ends are secured to a cable end head 129 just to the rear of the pulleys 116. See Figures 5 and 10. This cable head is adjustably secured by bolts 130 to the head 129' which is secured to cage 51 and supports the ends of rods 132 secured at their other end to head 95'' which is supported thereby.

The hydraulic cylinder is supplied with fluid under pressure and exhausted at the rear end by flexible pipe 133 and at the forward end of the cylinder by way of a flexible pipe 134. The operation is controlled by a valve 135 which is hand operated in this form though it may be otherwise moved. By this the valve 135 is connected to a hydraulic pressure by pipe 136 and to the discharge. The hydraulic system is of construction which can be supplied within the knowledge of those skilled in the art and is not regarded as necessary to be illustrated in full detail. Fluid under pressure may be supplied to pipe 136 by a pump driven by an electric motor or in any suitable manner. The pump 29 and the drive therefor Figure 2 has been described.

The belt connection as illustrated and described, provides for the advancement and retraction of the traveller 95 and thrust member 90 in direct response to the motion of the piston in the hydraulic cylinder which is under the control of the operator by means of the valve 35. The spring 98 provides for a quick advancement of the ice cake when the detent 102 is removed from the path of the ice cake through the carriage, such removal taking place at the end of the first upstroke of the carriage after the cake is supplied to the cage. This spring is provided in order that the cake may move instantly to scoring position and at this and other times to give the cake a sufficiently quick advancement when it has been released from the table 10 on the downward traverse and must advance into contact with the scoring table or guide 101 in order to give the desired uniform depth of scoring without variation.

The scores are indicated by reference character 140 in Figure 8 and the ice cake by 141. The scoring saw table 101 is made adjustable at right angles to its engaging surface which is the direction of the axis of the turntable to determine the depth of the score and the depth of the cutoff. To this end the scoring saw table 101 is supported on sliding plates 145 at each side of the machine, which plates 145 are mounted to slide in ways 146 in the supports 147 at each side of the door 2 in Figures 4 and 6. The plates 145 have openings 148 which surround the bearings 149 of the scoring shaft 17, permitting the plate to move relatively to said bearings which are stationary. The forward edge of this plate at 150, see Figures 6 and 9, is shown as inclined to the vertical and grooved parallel to the edge at 151. The scoring saw carrier plate 145 is moved in a fore and aft direction by means of an adjusting plate 152 which is mounted for vertical movement on support 147 in ways 146, being secured by a bolt 154 rested in the support and engaging a slot 155 in the plate 151. The adjusting plate 152 is provided with a series of lugs 156 arranged along its inclined edge and having keys 157 which enter and engage the groove 151. The supports 147 are provided with suitable bearings which receive the shaft of pinions 158, which pinions engage vertical racks 159 on the plates 152. The shaft of the pinions 158, of which there are two, it being understood that the plates 145 and 152 and supports 147 and ways 146 are duplicated on the two sides of the machine, a suitable key is provided for rotating the shaft of the pinion 158, whereby the table 101 is adjusted in a fore and afterly direction, to give any desired depth of scoring within predetermined limits, it being understood that the cake of ice is guided from and by the scoring table 101 to and into engagement with the cutoff saw 5, so that this table 101 determines not only the depth of scoring, but the depth to which the cubes are cut off.

While the ice cakes are made commercially of an approximate weight, as pointed out, and there may be some variation of dimension due to variation of the cans or distortion thereof in use, or to various causes. For this reason the cage 51 does not exactly fit the ice cake, some excess size in the part of the cage also being necessary in order to provide for the free admission of the cake. For this reason it has been found helpful to provide means for holding and centering the cake in the cage.

Plate springs 165 have been provided at the left side of the cage. These extend forwardly horizontally, being attached to the side walls near the rear at 166, see Figure 5, and deflected inwardly toward the front of the machine where they are supported at their forward ends 167 by inwardly and rearwardly inclined plate springs 168. Thus the forward end of the cake is freely admitted, but it is engaged by the springs with increasing pressure as it advances.

The ice cakes are adjusted against the tension of the springs 165 by means of adjusting plates 169, which are connected to the right hand side of the cage 51, near the rear at 170, and extend forwardly being permitted to swing slightly at their forward ends 171. These forward ends are advanced to center the ice cakes by screws 172.

The advantage of centering the cakes in this way has been pointed out in the preamble as making it possible when the cakes are slightly under dimension, to equalize the cubes cut at each side instead of making the cubes at one side so thin that they may not be fit for use.

The cake is by means of the springs and the adjustment screws held properly centered in the cage, also avoiding slippage, either side slip or slippage in any direction. This is of great advantage in protecting the saws which would be injured or destroyed by side motion of the ice cake.

To equalize the speed of the scoring saws and prevent slowing down when a temporary excess of resistance is encountered, a fly wheel 162 is mounted on the end of the scoring saw shaft 17.

The speed of operation of the carriage 50 may be controlled to suit the operator by means of the throttle valve 23, Figure 2, in the pipe 23' by which the fluid from the hydraulic cylinder is returned to the pump.

It is of interest regarding the delivery of the cut product that the delivery chute 8 Figure 6 is povotally mounted at 208, near its lower end, and the upper end of the chute rests at 201 against the rear of the frame of the guide or table 101 when the cake is not advanced into contact with the guide 101. When the cake is advanced, however, the upper end of the chute bears against the forward surface of the cake and when the cake moves to its uppermost position, the chute swings downwardly and to the first or dotted line position Figure 6 in which it rests against the frame of the guide 101, the upper end being beneath the cutoff saw, thus eliminating any chance that some of the cubes 8' might pass downwardly back of the chute into contact with the scoring saws where they might become wedged or otherwise have a harmful effect.

It is also noted that the door 2 is provided with a hand hole at the front over the top of the chute which gives access to the chute. This is closed by a pivoted shutter 200.

In connection with the delivery of the product it should be observed that the cutoff saw shaft 6, see Figures 4 and 6, is provided with a deflector 6' pointed at the bottom beneath the center of the shaft and inclined outwardly and upwardly on both sides of the point whereby any cakes that are thrown upwardly are deflected and divided, thus preventing clogging beneath the shaft. Also, there is a shield 123 forwardly of the cutoff saw 5 whereby the cubes and snow are prevented from coming in contact with the pulleys 21 and belts 20, and this plate is deflected downwardly and forwardly at the bottom at 123' for guiding the cubes toward the chute and preventing them from being thrown into contact with the belts. In the operation of the cutoff saw a considerable amount of snow or finely divided ice is formed which if permitted to accumulate might cause clogging. This snow is discharged from the base of the saw 5 at the left, as seen in Fig. 4, a conductor for the same being provided. This is indicated by reference character 6". The mouth of the conductor leads from the bottom quadrant to the saw 5 on the left, which quadrant is forward of the other bottom quadrant in the direction of rotation of the saw so that the bulk of the snow is thrown off of the saw into the conductor, being discharged therefrom at the side of the machine.

The operation of the saws about stationary axes and the reciprocation and change of angle of the cake and the feed of the cake in the direction of the axis about which the angle is changed is regarded as an important improvement as compared to the type of machine in which cutting is effected by feeding the saws relatively to a stationary cake or one which is moved to effect part of the results attained in cutting.

The use of the hydraulic means for reciprocating the carriage and hydraulic means for effecting the feed is also regarded as having important advantages over obvious constructions including toothed or other mechanical gearing and connecting rods and the like for feeding the cake and reciprocating the carriage. The hydraulic device has the advantage of cushioning the operation and checking the operation at the end of the strokes of the carriage, also the hydraulic feed is conveniently carried on the carriage and connected by means of flexible tubing, making it more adaptable to applicant's operation than any other type of feed.

Applicant's arrangement by which the subsequent movement of the carriage is after each reciprocation deferred until the cake has been completely turned, is of great importance in effecting uniformity of cut and uniformity of the angles between the surfaces of each cake.

The segmental friction gears illustrated have important advantages over complete circular gears in that the pinions are out of contact at the end of each change of angle of the carriage so that while the drive of the pinions is continuous, there is no friction between the pinions and gears and hence no grinding during the dwell at the ends of the stroke of the carriage after turning has been completed.

It is also of importance that the lifting chains 61 are connected to the top of the carriage near the ends of the same in the direction of feed so that as the length of the cake is reduced by cutting and the equilibrium of the carriage, i. e., its center of gravity, is changed and moved toward the forward end, there is no tendency to cock the carriage and cramp it on the ways. To this end the sprockets 64 at the top are keyed to the shaft 65 on which they are mounted so that the motion of the two gears 64 is constant. Hence the let off and take up of the chains 61 is likewise constant. In furtherance of this result, the gears 63 are likewise keyed to the shaft 62', though this may not be essential to the result.

In the operation of the machine an ice cake having been consumed, assume that the machine has been stopped by opening valve 23, or stopping the motor. As pointed out in the description of the feed a new cake is advanced over the rollers 85 into the cage 51 which at this time is arranged with its greatest transverse dimension in vertical alignment as illustrated in Figure 10. At this time the side of the cage frame 107 rests against the stop 81 at 83, see Figure 10. The detent 102 having been released by the expiration of the previous cake has been moved by the spring 108 into the path of the new cake as shown in Figure 10, the notch 105 engaging plate 106. The thrust member 90, the arm 94 and the traveller 95 are retracted and moved to the rear by operation of the piston in cylinder 114 controlled by valve 135. The traveller 95 having been released from the track 111 by its movement to the extreme rear beyond the end of said track is swung downwardly about the rod 96 out of the path of the cake which is thus permitted to enter the cage which has been lowered by opening the valve 23 for a short time or the valve being opened by running the motor for a short time until the carriage is in the right position.

It is of interest at this point that the hydraulic operation of the feed controlled by the valve 135 makes it unnecessary at any time for the operator to reach the inside of the cage to withdraw the thrust member 90. A hazard incident to other machines is thus avoided, as reaching inside the cage would involve the possibility of contact of the hand with the saws. It is also to be noted that while a specific device has been described the cake may be brought into cutting relation with the cutoff saw by any suitable means sufficient to move it transversely of the direction of reciprocation into cutting relation with said saw and that any means may be used for reciprocating the cake.

The cake is brought into contact with holding and centering members 165 and 169 and then thrust forwardly from the feed end into contact with the detent 102. Thrust member 90 supported on its arm 94 and traveller 95 is then swung upwardly into alignment with the cake and the traveller is advanced into the slot between the tracks as shown in Figure 10, the valve 135 being opened for this purpose. The arm 94 and thrust member are supported by the traveller and track in the position shown in said figure. The cake is then centered by operation of screws 172 if further adjustment is necessary. The valve 23'' is then closed to provide for the continuous reciprocation of the carriage 50 on the guide rods 74; in the form of the invention shown this reciprocation is in a vertical direction and for the purposes of the invention being preferably near the upright so as to utilize the help of gravity in moving the cake. During the first upward traverse of the carriage the ice rests against the detent 102 out of contact with the saws and no cutting takes place. At the top of the traverse the turntable 46 is turned to the left as seen in Figure 10 through an arc of 90 degrees bringing the stop surface 81 on the cage into contact with the top horizontal surface 82 of the stop 81. The operation of the segmental grooved friction pulleys 45'' and 45''', on the turntable and the grooved friction pinions, 45, 45' near the top of the casing has been fully explained. This takes place while the carriage is stationary. As the cage approaches its horizontal position, one cam 69 thereon engages the roller 67 on the valve lever 66, changing the position of the valve 64 of the hydraulic cylinder 53 so as to cause the downward traverse to take place. Between the termination of the upward traverse and the change of position of valves the carriage 50 being stationary, the pressure in the hydraulic cylinder is slightly increased. The ice cake is now in contact with the cutoff saw table 10 and as it moves with the downward motion of the carriage, downwardly beyond this table over the inclined guides 16, the cake moves forwardly into the position in which it is illustrated in Figure 6, the spring 98 and thrust member 90 having the effect of giving a quick advance to the cake as aforesaid so that it encounters scoring saw table 101 before it engages saws 7. The hydraulic piston in the cylinder 114 is also effective to advance the cake, the spring being provided for additional speed and hence certainty of operation as just described.

Scoring of the cake in the direction of its short transverse dimension now takes place by the operation of the scoring saws 7 on the shaft 17, best illustrated in Figure 6.

The carriage then moves on to its bottom position in which it stops as at the top of the stroke and by the same means repeated at the bottom of the machine. The other cam 69 then engages roller 68 Figure 2 and reversal takes place as described in connection with the operation at the upper end of the traverse after turning through an arc of 90 degrees. At this time pinions 38 and 38' engage pulleys 38'' and 38'''. The cake again moves up in contact with the scoring table 101 and the cake is scored in the direction of its greatest traverse direction at right angles to the previous scoring. As the cake moves upwardly, it enters the slot between the curved guides 16, and the cutoff saw 5 severs the cubes which have been scored at right angles in both directions. It is of interest that the cutoff saw cuts in a plane of the cake determined by guide 101 it being an incident of operation, that table 101 positions the cake for all cuts, the cake being guided thereby not only in scoring but from the second scoring operation to the cutoff saw and when the cutoff saw once enters the cake it positions the cake, which cannot be moved forwardly relatively to the saw during operation.

The cubes as severed pass down and out off the machine along the discharge chute 8 at the end of which they may be caught in a suitable receptacle. Just forwardly of the ice the door 2 is provided with a hinged cover 200 which permits access to the chute in case of failure of the discharge to function properly for any reason.

The objects of the invention and the advantage of this invention have been fully set forth in the preamble.

We have thus described specifically and in detail a machine embodying the features of the invention in the preferred form in order that the manner of constructing, applying, operating and using the invention may be fully understood. However, a wide variation of detail and arrangement is contemplated and it should be understood that the specific terms herein are used descriptively rather than in a limiting sense, the scope of the invention being defined in the claims.

What we claim as new and desire to secure by Letters Patent is:

1. A machine for cutting blocks or cakes of ice or other material into small substantially uniform blocks comprising a carriage, means for reciprocating the carriage on a substantially upright path, means on the carriage for holding and guiding a cake, a gang of scoring saws projecting into the path of the cake, a cutoff saw at right angles to said scoring saws and substantially parallel to said path, means for turning the holding means and the cake at each end of the path of reciprocation, the holding and guiding means comprising a passage for the cake disposed toward the said saws, a counterbalance for said carriage the means for reciprocating the carriage comprising a fluid pressure cylinder and a piston connected to said weight to move the same and the carriage, the latter moving oppositely to the weight.

2. A machine for cutting blocks or cakes of material into small uniform blocks comprising a carriage, means for reciprocating the carriage on a predetermined path, a gang of scoring saws projecting into the path of the cake on the carriage, a cutoff saw substantially at right angles to the scoring saws and parallel to said path, a turntable on said carriage, supporting means for the ice cake on the turntable, turning means comprising means mounted on the turntable and means at the opposite ends of said path of reciprocation adapted to engage said turning means respectively to operate the same at the ends of said path to turn the table and the ice cake through a predetermined arc at one end of the path and to return it through said arc at the other end of the path, said supporting means being arranged and adapted to the feeding of the cake toward the cut-off saw, causing it to project beyond the cut-off saw, and a guide for the material offset beyond the cut-off saw in the direction of said feed and parallel to the path of reciprocation to determine the thickness of the material severed by the cut-off saw.

3. A machine as described in claim 2, having means for stopping the carriage for a short period at each end of its path, the turning means having a power-operated drive and comprising means whereby it is engaged for operation to turn the turntable substantially during the period in which the carriage is stationary.

4. A machine as described in claim 2, having means for effecting the reversal of the motion of the carriage at each end of its reciprocative path and tripping means for said reversing means and operating means for said tripping means carried by said turntable and located thereon to engage said tripping means at the ends of the arc of rotation of the turntable.

5. In a machine for cutting blocks or cakes of ice or other material into relatively small blocks, a frame, a carriage mounted to reciprocate on a predetermined path, a turntable thereon and holding and guiding means for an ice cake on said turntable, a gang of scoring saws projecting into the path of the cake, means for turning the table through a predetermined arc at one end of said path and means for returning it through said arc at the other end of said path, a cutoff saw having its cutting plane transverse to the scoring saws, means to present the cake to the saws, and a plurality of tables parallel to the plane of the cut-off saw—one being substantially in the plane of said saw and comprising a plurality of guides spaced according to the pre-determined width of the cake, and the other table being spaced beyond the cut-off saw in the direction of feed and adapted to engage the cake in each scoring operation, and in each cut-off operation to determine the thickness of the cut-off.

6. A machine for cutting blocks or cakes of ice or other material into relatively small blocks comprising a carriage mounted to reciprocate on a predetermined path, a turntable thereon and holding and guiding means for a cake on said turntable arranged tranversely to said predetermined path, scoring saws and a cut-off saw in cutting relation to said path, feeding means for the cake of ice comprising a pusher for advancing the cake of ice or other material along said guiding means into cutting relation with said saws a guide for the pusher a flexible tension member for moving the pusher, said guide having means at the rear of the machine whereby the pusher is released permitting it to be moved out of the path of the ice to admit a new cake to the holding means.

7. A machine for cutting blocks or cakes of ice or other material into relatively small blocks comprising a carriage mounted to reciprocate on a predetermined path, a turntable thereon and holding and guiding means for a cake on said turntable arranged transversely to said predetermined path, scoring saws and a cut-off saw in cutting relation to said path, feeding means for the cake of ice comprising a pusher to engage the ice cake from the rear, a guide for the pusher for advancing it to feed the cake or other material along said guiding means into scoring and cutting engagement with the saws, said guide having means for releasing the pusher at the rear end of the machine and said pusher being mounted for movement laterally of the guide so that it may be moved out of the path of the ice cake to provide for the admission of a new cake of ice.

8. A machine for cutting blocks or cakes of ice or other material into relatively small blocks comprising a carriage mounted to reciprocate on a predetermined path, a turntable thereon and holding and guiding means for a cake on said turntable arranged transversely to said predetermined path, scoring saws and a cut-off saw in cutting relation to said path, feeding means comprising a pusher to engage the ice cake from the rear, means for guiding the pusher and advancing it to feed the cake along said guiding means into scoring and cutting engagement with the saws, said guide having means for releasing the pusher at the rear end of the machine and said pusher being mounted for movement laterally of the feed so that it may be moved out of the path of the ice cake to provide for the admission of a new cake of ice, power operated means for advancing and retracting the pusher and means for applying said power means to advance the pusher and retract it.

9. In a machine for cutting cakes of ice into small substantially uniform blocks by sawing, a carriage, means for guiding and reciprocating the carriage on a predetermined path, a series of parallel scoring saws projecting into the path of the ice cake, a cutoff saw arranged transversely to the scoring saws, a turntable on the carriage and ice cake holding and guiding means on the turntable, means for driving the saws, a casing for said machine, a protecting panel mounted on said casing which has an opening covered by said panel which is mounted to move to open and close said opening, the saws being mounted on the inside of said panel so that they are normally protected to be exposed only when the said panel is open and means for automatically discontinuing the saw drive when the panel is opened.

10. A machine as in claim 9, the saw driving means comprising an electric motor, the stopping means comprising a switch in the motor circuit operated by the door to open the circuit and stop the saws as the door is opened.

11. A power-driven automatic machine for cutting blocks or cakes of ice or other material into small blocks comprising a carriage, means for reciprocating the carriage, a turntable thereon, holding means on the turntable for a cake of ice, a gang of scoring saws projecting into the path of the cake, a cutoff saw also in said path substantially at right angles to the scoring saws and parallel to said path, means for turning the table at each end of its path comprising gearing mounted on the turntable and gearing near the opposite ends of the said path of reciprocation adapted to engage said gearing on the turntable at the ends of its path to turn the table and the ice cake through a predetermined arc at one end of the path and to return it through said arc at the other end of said path and means for locating the turntable in both positions.

12. A power-driven automatic machine for cutting blocks or cakes of ice or other material into small blocks comprising a carriage, means for reciprocating the carriage, a turntable thereon, holding means on the turntable for a cake of ice, a gang of scoring saws projecting into the path of the cake, a cutoff saw also in said path substantially at right angles to the scoring saws and parallel to said path, means for turning the table at each end of its path comprising friction gears mounted on the turntable and friction pinions at the opposite ends of the said path of reciprocation adapted to engage said gears and operate the same at the ends of said path to turn the table and the ice cake through a predetermined arc at one end of the path and to return it through said arc at the other end of the path, and arcuate anti-friction means supporting the turntable on the carirage, said means being spaced outwardly from and concentric with the axis of the turntable.

13. A machine as in claim 33 the means for reciprocating the cake of ice comprising a fluid pressure cylinder a piston therein, the cylinder being arranged with its axis in upright position, said predetermined path being likewise upright and substantially parallel to said axis, and the carriage being connected to said piston to operate in direct correspondence with the motion of the piston and means under the control of the operator for checking the flow of the hydraulic fluid to control the speed of reciprocation.

14. A machine for cutting cakes or blocks of ice or other material into relatively small blocks comprising a carriage mounted to reciprocate on a predetermined path, a turntable thereon and holding and guiding means for a cake of ice on said turntable, a gang of scoring saws projecting into the path of the cake, means for turning the table in a predetermined arc at one end of its path and means for oppositely turning it at the other end of its path, a cutoff saw in and parallel to said path and substantially at right angles to the scoring saws, means to permit the feeding of the cake along said guiding means and transversely to the path of reciprocation to present it to the saws, the machine having a stop on said turntable to the rear of the plane of the cutoff saw in the path of feed of the ice to check the advance of the ice and prevent feeding to the cutoff saw prior to the initial scoring and means for removing said stop from the path of the ice as the carriage approaches the end of its path permitting the cake to be fed to the scoring saws for the said initial scoring operation causing this operation to take place prior to the first cut by the cutoff saw.

15. In a machine for cutting cakes of ice and the like into cubes having scoring and cutoff saws, means for reciprocating the cake and turning it at each end of its path of reciprocation to present it to the scoring saws, means for feeding it to the cutoff saw transversely to said reciprocations, a table parallel to the path of reciprocation and transverse to the scoring saws for supporting the cake in scoring relation to the scoring saws to determine the depth of score, a second table parallel to the first said table for supporting the cake adjacent but out of cutting relation with the cutoff saw, said latter table being located rearwardly as to the feed in its relation to the scoring saw table said tables being spaced to determine the thickness of the material severed by the cutoff saw, the means for feeding the cake comprising a pusher, means for advancing the pusher from the rear of the machine on a path included in the path of the cake as it is fed and resilient means supporting the pusher in the direction in which it is advanced, said resilient support permitting the pusher to yield backwardly in relation to the feeding pressure when the cake is in contact with said tables, and serving to advance the cake instantaneously from the plane of the cutoff saw table to the plane of the scoring saw table as the reciprocation of the carriage moves the cake out of contact with the former, said quick advance serving to assure scoring of the entire cross section of the cake to the depth determined by the position of the scoring saw table relatively to the scoring saws.

16. In a machine for forming small blocks by sawing a cake of ice, holding means for the ice cake comprising an enclosure for the ice cake, scoring saws and a cutoff saw and means for moving the holding means to present the ice to said saws in scoring and cutting off, said holding means having a spring takeup at one side with a longitudinally extending member to engage the cake from that side, an adjustable thrust device having a longitudinally extending member for contacting the ice opposite said spring takeup for centering and adjusting the cake, said longitudinally extending members being connected to said holding means at the rear, the pressure of said spring and the adjustable thrust being applied forwardly of said connections and near the end of the cake engaged by the saws.

17. In a machine for forming small blocks by sawing a cake of ice or other material holding means for the cake comprising an enclosure for the ice cake, scoring saws and a cutoff saw, and means for moving the holding means to present the ice to said saws for scoring and cutting off, said holding means having a spring takeup at one side to apply resilient pressure to the cake from one side and an adjustable thrust device for determining the position of the cake and centering it, said spring take up and adjustable thrust having simultaneous and opposite engagement with said cake holding it for presentation to the saws and preventing vibration in sawing.

18. In a machine for sawing cakes of ice to produce relatively small blocks, a carriage mounted to reciprocate on a predetermined path and means for reciprocating the carriage, ice cake holding means mounted on the carriage, and movably supported thereon for change of angle of the ice cake relatively to the carriage, means for swinging the holding means relatively to said path to effect said change, said reciprocating means having a tripping device for changing its direction, means mounted to move in correspondence with the holding means as its angle is changed relatively to the carriage, said means being positioned to engage the tripping means near the end of each said swing.

19. In a machine for sawing cakes of ice to produce relatively small blocks, a carriage mounted to reciprocate on a predetermined path and means for reciprocating the carriage, ice cake holding means mounted on the carriage, and movably supported thereon for change of angle of the ice cake relatively to the carriage, means for moving the holding means to effect said change, said reciprocating means having a tripping device to reverse the carriage at the end of each reciprocation, means mounted to move in correspondence with the holding means as the angle is changed relatively to the carriage, said means being positioned to engage the tripping means near the end of each change of angle of said cage, means for positioning said holding means at the end of each change of angle, and guiding means for causing the cake to approach the saws in the proper angular position relatively to the carriage for limiting the scores to the desired angle.

20. In a machine for sawing cakes of ice to produce relatively small blocks, a carriage mounted to reciprocate, and means for reciprocating the carriage, ice cake holding means mounted on the carriage, and movably supported thereon for change of angle of the ice cake relatively to the carriage, said reciprocating means having a tripping device, means moving with the holding means as its angle is changed relatively to the carriage, said means being positioned to engage and operate the tripping means at the end of each change of angle of said cage, means for positioning said holding means at the end of each change of angle, and guiding means for guiding the cake to approach the saws in the proper angular position relatively to the carriage to prevent scoring at the wrong angle and limiting the scores to the desired angle, said turning means comprising segmental friction gears and cooperating friction pulleys, the length of said gears being limited to an arc corresponding to the arc of turn so as to prevent grinding of the pinions on the segmental gears when the change of angle is completed.

21. In a machine for sawing cakes of ice to form relatively small blocks, a carriage for the ice cake mounted to reciprocate on a predetermined path which is substantially upright, means for reciprocating said carriage, means for supporting the cake on said carriage, said supporting means being mounted for change of angle of said means and of the cake, means for feeding the cake along the carriage toward one end transversely to the movement in changing said angle, scoring saws and a cutoff saw mounted in the path of the cake adjacent said end, said means for reciprocating the carriage comprising lifting chains engaged with said carriage near the opposite ends of said carriage in the direction of feed, sprockets supporting the chains, each said chain being engaged with a corresponding sprocket, the sprockets being substantially over the points of engagement of the chains with the carriage, and means connecting said sprockets together to rotate together, equalizing the motion of the two ends of the carriage and preventing cocking of the carriage as the ice is consumed at the forward end in the direction of feed, thus disturbing the equilibrium of the carriage.

22. In a machine for reducing cakes of ice to blocks of relatively small size, a carriage mounted to reciprocate on a substantially vertical path, means for supporting a cake of ice thereon, said means being movably mounted to change the angle of the cake relatively to the carriage, means for operating the carriage, means for turning the support, means for feeding the cake along the carriage transversely to the motion in changing the angle of the cake, scoring and cutoff saws mounted in the path of the ice cake thus supported, the means for moving the carriage on said path comprising lifting means engaging said carriage near the opposite ends thereof in the direction of feed, and means connecting said opposite lifting means to move equally and simultaneously.

23. In a machine for cutting cakes of ice into relatively small blocks, scoring saws and a cutoff saw transversely arranged as to each other, means for reciprocating a cake in a direction substantially parallel to the planes of said saws and means for feeding it toward the scoring saws transversely to the direction of reciprocation, a movable stop for holding the ice to prevent contact with the scoring saws in the initial traverse of said reciprocations and means for withdrawing said stop from the path of the ice, near the end of the path of reciprocation, said feed comprising resilient means for instantaneously advancing the cake immediately after the stop is withdrawn.

24. In a machine for cutting cakes of ice and other materials into relatively small blocks, scoring saws and a cut-off saw transversely arranged as to each other, means for reciprocating a cake in a direction substantially parallel to the planes of said saws and means for feeding it toward the scoring saws transversely to the direction of reciprocation, a movable stop for holding the ice to prevent contact with the scoring saws in the initial traverse of said reciprocations and means for withdrawing said stop from the path of the ice, near the end of the path of reciprocation, an abutment for preventing contact of the cake with the cutoff saw in the initial reciprocation, the abutment terminating beyond the cutting area of the scoring saws, said feeding means having a resilient element to advance the cake instantaneously when the stop is withdrawn and the cake passes the abutment in the direction of the scoring saws.

25. A machine for cutting blocks or cakes of ice or other material comprising a frame, a carriage, means for reciprocating the carriage on a predetermined path, scoring saws and a cutoff saw transverse to each other and parallel to said path, the carriage having a turntable and means providing for the feeding of a cake laterally of said path to cutting relation with said cutoff saw, the frame carrying means at each end of said path and the carriage having cooperating means thereon for turning the table at each end of its path the scoring and cutoff saws being between said ends, the reciprocating means comprising a trip to reverse the carriage and means carried by the turntable and operated by the turning of said table to engage the trip and effect the reversal of the motion of the carriage.

26. A machine for cutting blocks or cakes of ice or other material comprising a frame, a carriage means for reciprocating the carriage on a predetermined path, scoring saws and a cutoff saw transverse to each other and parallel to said path, the carriage having a turntable and means providing for the feeding of a cake laterally of said path in to cutting relation with said cutoff saw, the frame having turning means and the table having cooperating means for turning the table at each end of its path, the scoring and cutoff saws being between said ends, a scoring saw guide and a cutoff saw guide parallel to said path and having their parallel planes spaced in the direction of said lateral feed by a distance which determines the thickness of material severed by the cutoff saw.

27. A machine for cubing ice or other materials having a carriage power-operated means for reciprocating the same on a substantially upright path, means for turning a cake of ice or other material on said carriage at each end of said reciprocation, scoring saws and a cutoff saw parallel to said path and arranged along said path between said ends, means for driving said saws, said machine having a base to rest on the floor, all said machine being above the floor, the loading position of the carriage being at the bottom of its path of reciprocation and substantially adjacent the floor level for convenience in feeding the cakes.

28. In a machine for cutting blocks from a body of solid material, a carriage, means for reciprocating the same on a pre-determined path, a hopper on said carriage having means for presenting the material transversely of said path, the hopper being of oblong cross section transversely to the said direction of presentation, means for turning the said hopper near each end of said path and about an axis substantially parallel to the direction of presentation, a series of scoring saws and a cut-off saw transverse to the scoring saws, all said saws being in cutting relation to said path, a cut-off saw table having a supporting surface adapted to support the body of material immediately after the cut-off, a scoring saw table offset from the cut-off saw table in the direction of presentation, the off-set corresponding to a predetermined thickness of the blocks to be cut, the scoring saw table being arranged in guiding relation with both the cut-off saw and the scoring saws, the cut-off saw table having an opening in line with said path and of a width corresponding to the short dimension of said cross section, and the reciprocating and turning means being timed to move the hopper into registration with and along said opening in the direction of its long dimension, whereby said body after cutting and turning spans said opening.

29. In a machine for cutting blocks from a body of solid material, a carriage, means for reciprocating the same on a pre-determined path, a hopper on said carriage having means for presenting the material transversely of said path, means for turning said hopper near each end of said path and about an axis substantially parallel to the direction of presentation, a series of scoring saws, a cut-off saw transverse to the scoring saws, all said saws being in cutting relation to said path, a cut-off saw table having a supporting surface substantially in the plane of the cut-off saw and adapted to support a body of material immediately after the cut-off, a scoring saw table offset from the cut-off saw table in the direction of presentation, the offset corresponding to a predetermined thickness of the blocks to be cut, the scoring saw table being arranged in guiding relation with both the cut-off saws and the scoring saws, the cross section of the hopper transverse to the direction of presentation and parallel to said tables, being oblong and adapted to receive bodies of material of similar cross section, said cross section having a long and short transverse dimension, and the reciprocating and turning means being timed to move the hopper and the material therein in the direction of the long dimension of said cross section toward the cut-off saw, and the cut-off saw table comprising a plurality of members spaced apart by a distance corresponding to said short cross sectional dimension and less than said long cross sectional dimension whereby the body of material enters between said members prior to and during the cut-off and the long dimension of the material spans said members after cutting and turning, the material on the return stroke of the hopper being advanced to the extent of said off-set.

30. In a machine for cutting blocks from a body of solid material, means for reciprocating said body on a predetermined path and turning it near each end of said path, the axis of turning being transverse to said path, a cut-off saw and a table adjacent the plane of said saw and adapted to support said body after cutting off, scoring saws transverse to said cut-off saw and substantially parallel to said path, a scoring saw table in guiding relation to the cut-off saw and to the scoring saws, all of said saws being in operative relation to said path, and the cut-off saw being unobstructed on the side towards the scoring saws to provide for the passage of said body along the scoring saw tables in scoring relation to the scoring saws and in cut-off relation to the cut-off saw, the hopper being adapted to present said body of material to said tables and said saws and the scoring saw table being offset from the cut-off saw table on the side of the latter opposite the hopper.

31. In a machine for cutting bodies of solid material of oblong cross-section into blocks of relatively small dimensions, comprising a carrier for said body, means for reciprocating the carrier providing a forward and return stroke on the same path, the carrier having means to present the body being cut, toward the saws in a direction transverse to said path, means for turning the carrier about an axis extending in the said direction of feeding in regularly-timed relation to the reciprocations, scoring saws and cut-off saws in operative relation to said path, the turning providing for two sets of intersecting scores and the cut-off saw being arranged parallel to the path and transversely to said axis, a scoring saw guide parallel to the path of reciprocation for supporting the body in scoring relation to the scoring saws, and in cut-off relation to the cut-off saws, and a second guide spaced from the scoring saw guide in a direction opposite to the feed by a distance equal to the desired length of the cut-off, and having an opening for the admission of the small dimension of the said cross-section of the body being cut, and of less width than the long dimension of the same, said opening to be spanned by said latter dimension of said body to support the body after the cut-off.

32. In a machine for cutting bodies of material into blocks of relatively small dimensions, a carrier for said body, means for reciprocating the carrier providing a forward and return stroke on the same path, means for turning the carrier in regularly-timed relation to said reciprocations, scoring saws and a cut-off saw in operative relation to said path, the carrier having means to present the body being cut toward the saws in a direction transverse to the plane of the cut-off saw, a guide for supporting said body in cutting relation to the saws, a guide for supporting the body after the cut-off, some of said turning operations taking place while the body is supported by said latter guide, the latter guide being spaced from the first-mentioned guide in a direction opposite to the direction of feed by a distance determining the spacing of the cuts of the cut-off saw.

33. A machine for cutting cakes of ice or bodies of other material in small substantially uniform blocks comprising a frame, a carriage for the cake of ice, means for reciprocating the carriage on a single pre-determined path, a gang of scoring saws adjacent the path of the cake on the carriage and a cut-off saw arranged transversely to the cutting planes of the scoring saws and having its cutting plane substantially parallel to the path of the cake, means on the carriage providing for the feeding of the cake along the carriage in cutting relation to the saws, means on the carriage and cooperating means on the frame for turning the cake at each end of said path after each scoring operation to provide two series of intersecting scores, the machine also comprising two guiding members, one being adjacent to the plane of the cut-off saw and the other being beyond the cut-off saw in the direction of said presentation to correspondingly space the cuts of the cut-off saw.

34. In a machine for sawing blocks or cakes of ice and the like to produce relatively small blocks, a carriage for the ice and the like, mounted for reciprocation on a single path in a substantially upright direction, and a fluid pressure cylinder with a piston therein similarly disposed, the piston being connected to the carriage whereby the carriage moves in close correspondence with the piston strokes, means on the carriage providing for the feeding of the cake along the carriage and means for turning the cake at the ends of the path of the carriage, scoring saws and a cut-off saw to which the ice is thus fed for scoring and cutting off the scored portions, said saws being arranged in the path of said cake, resulting from said feed and reciprocation, and means for operating the saws.

35. A machine for cutting blocks or cakes of ice or other material to form small blocks, the same comprising a gang of scoring saws and a cutoff saw transverse thereto, means for reciprocating the cake and turning it at each end of its path to bring it in scoring relation with the scoring saws, means providing for the movement of the cake at right angles to said reciprocation for presenting it to the cut-off saw, the cut-off saw having a plurality of guard means adjacent the plane of cutting and adjacent the path of the cake on each side of said path as it approaches the saw, said guard means being spaced apart to provide an opening sufficient for the admission of the cake of ice when presented with its short transverse dimension at right angles to the direction of reciprocation, said respective guard means being spaced apart by a distance less than the long transverse dimension of the cake to prevent the cake from coming in contact with the saw in any other position than that in which its long dimension is disposed in the direction of reciprocation.

36. In a machine for cutting cakes or blocks of ice or other material into small blocks, scoring saws and a cut-off saw, means for reciprocating the cake and turning it at each end of its path to score it, the machine being adapted to further move the cake at right angles to said reciprocations to present it to the cut-off saw, the path of reciprocation being substantially upright, an elongated inclined delivery chute for the cubes, said chute being pivotally-mounted to rest against the forward surface of the ice cake and to swing backwardly about said pivot to close the discharge from the cut-off saw as the ice cake moves upwardly above the rear of the chute, and a support for the chute in the backward position.

37. A machine for cutting cakes of ice and the like into cubes, having scoring saws, a cut-off saw, means for reciprocating the cake and means presenting it to the scoring saws and cut-off saw, the combination of a discharge chute for the cubes below the cut-off saw and a discharge conductor for snow leading from the cut-off saw at the side of the discharge chute which carries the cubes, said side being that toward which the bottom of the saw moves in rotation.

38. In a machine for cutting cakes of ice into relatively small blocks, scoring saws and cut-off saw transversely arranged as to each other, automatic power-operated means for continuously reciprocating the cake in a direction substantially parallel to the planes of said saws, automatic means for turning it at each end of its path, and means providing for the feeding of the cake toward the scoring saws transversely to the direction of reciprocation, a movable stop for holding the ice to prevent contact with the scoring saws in the initial half of the first reciprocation and means for withdrawing said stop from the path of the cake to permit scoring of the cake in the second half of said first reciprocation, and thereafter until consumed.

39. A machine for cutting blocks or cakes of ice or other material comprising a frame, a carriage, means for automatically reciprocating the carriage on a single, predetermined path, scoring saws and a cut-off saw transverse to each other and parallel to said path, the carriage having a turn-table and means providing for feeding the cake laterally of said path, a guide beyond the cut-off saw in the direction of the feed of the cake, along the carriage, said feeding operation causing the cake to engage said guide during each cut-off operation, and to project a pre-determined distance beyond the cut-off saw, power driven means on the frame adjacent the opposite ends of the stroke operating at each end of said path, the carriage having cooperating means for turning the table at each end of its path, the scoring and cut-off saws being between said ends and arranged along said path.

40. In a machine for cutting a body of solid material into relatively small blocks, a carriage, means for reciprocating the carriage along a single pre-determined path, means on said carriage to present the bodies to be cut in a direction transversely to the path of reciprocation, scoring saws and a cut-off saw intermediate of said path, the planes of said scoring saws being at right angles to the plane of said cut-off saw, and said saws being in the path of said body at the forward end of said presenting means in the direction of presentation, automatic means for turning the presenting means near each end of the path about an axis substantially parallel to the direction of presentation and means for determining the motion of the body being cut in the direction of presentation to score and cut off blocks of a pre-determined thickness.

JAMES F. TURNER.
CHRISTIAN P. BREIDENBAUGH.